(12) United States Patent
Carle et al.

(10) Patent No.: US 6,299,268 B1
(45) Date of Patent: Oct. 9, 2001

(54) METALLIC FRAMEWORK EQUIPPED WITH A PROGRESSIVE TIGHTENING CORNER-PIECE, IN PARTICULAR FOR AN ELECTRICAL CABINET

(75) Inventors: Pierre Carle, St Pierre D'Albigny; Kazimir Laboch, Meylan; Jean-Pierre Pin, St Etienne de St Geoirs, all of (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/640,176

(22) Filed: Aug. 17, 2000

(30) Foreign Application Priority Data

Sep. 15, 1999 (FR) .................................................. 99 11693

(51) Int. Cl.[7] .................................................... A47B 47/00
(52) U.S. Cl. ...................................... 312/265.4; 312/265.1
(58) Field of Search ................................ 312/257.1, 263, 312/264, 265.1, 265.2, 265.3, 265.4, 111, 140; 211/26, 189, 195, 182

(56) References Cited

U.S. PATENT DOCUMENTS

| 5,228,762 | 7/1993 | Mascrier ............................ 312/265.4 |
| 6,019,446 | * 2/2000 | Laboch et al. ................. 312/265.4 X |

FOREIGN PATENT DOCUMENTS

| 0 866 531 | 9/1998 | (EP) . |
| 1278118 | * 10/1961 | (FR) .................................. 312/265.1 |

\* cited by examiner

*Primary Examiner*—Peter M. Cuomo
*Assistant Examiner*—James O. Hansen
(74) *Attorney, Agent, or Firm*—Parkhurst & Wendel, L.L.P.

(57) ABSTRACT

A frame is equipped with joining parts formed by bipods which are equipped with positioning means in the intermediate common part for fixing of the girders. Each positioning means comprises at least one pair of bearing faces arranged in a V-shaped confining a corner-piece with an acute angle in which the girder of conjugate shape fits. An assembly screw performs progressive tightening of the girder onto the corner-piece of the bipod.

8 Claims, 9 Drawing Sheets

METALLIC FRAMEWORK EQUIPPED WITH A PROGRESSIVE TIGHTENING CORNER-PIECE, IN PARTICULAR FOR AN ELECTRICAL CABINET

BACKGROUND OF THE INVENTION

The invention relates to a metallic framework in the form of a rectangular parallelepipedic frame, in particular for an electrical cabinet, comprising: vertical uprights in the form of pillars assembled to cross-members extending in the depthwise direction of the frame to constitute on the opposite sides two quadrangular sub-frames formed by profiled sections, joining parts arranged at the corners of the frame for inter-connection of the uprights to the cross-members, each joining part being shaped as a bipod comprising a first fitting element arranged at a right angle with a second fitting element, and horizontal girders extending in the widthwise direction of the cabinet to provide the mechanical junction between the two sub-frames.

STATE OF THE TECHNIQUE

The document EP 866,531 filed by the applicant describes a frame of an electrical cabinet in which the girders are fitted onto the uprights by a fixing system with hyper-static corner-pieces.

According to another known frame, tripods are used as joining parts to assemble the uprights, cross-members and girders. Connection of the cables to the cabinet remains difficult as the elements constituting the framework are not able to be disassembled.

OBJECT OF THE INVENTION

The object of the invention is to achieve a frame for an electrical cabinet which is easy to assemble, has a good mechanical strength, and makes for easy connection of the cables. The device according to the invention is characterized in that each joining part is equipped with positioning means in the intermediate common part for fixing of the corresponding girder, said positioning means comprising at least one pair of bearing faces arranged in a V-shape confining a corner-piece with an acute angle into which the girder of conjugate shape fits, and an assembly screw for progressive tightening of the girder onto the corner-piece of the bipod.

According to a preferred embodiment, the corner-piece presents a trapezoid cross section open at the front and closed at the rear by a back face. A tapped hole is arranged in the center of the common part to receive the fixing screw. The fictitious peak of the acute angle of the corner-piece is placed in the alignment of the tapped hole.

According to one feature of the invention, the acute angle of the corner-piece is comprised between 20° and 40°. An optimum contact pressure of the girder on the corner-piece is thus obtained, while at the same time facilitating subsequent disassembly.

According to another feature of the invention, the girder comprises a W-shaped section having at each end a hole for insertion of the fixing screw. A seal can also be fitted between the girder and the common part of each joining part. The girders can be made of aluminium or steel.

BRIEF DESCRIPTION OF THE DRAWINGS

Other advantages and features of the invention will become more clearly apparent from the following description of an embodiment of the invention given as a non-restrictive example only and represented in the accompanying drawings in which.

DETAILED DESCRIPTION OF THE PREFERRED EMBODIMENT

Figure 1:
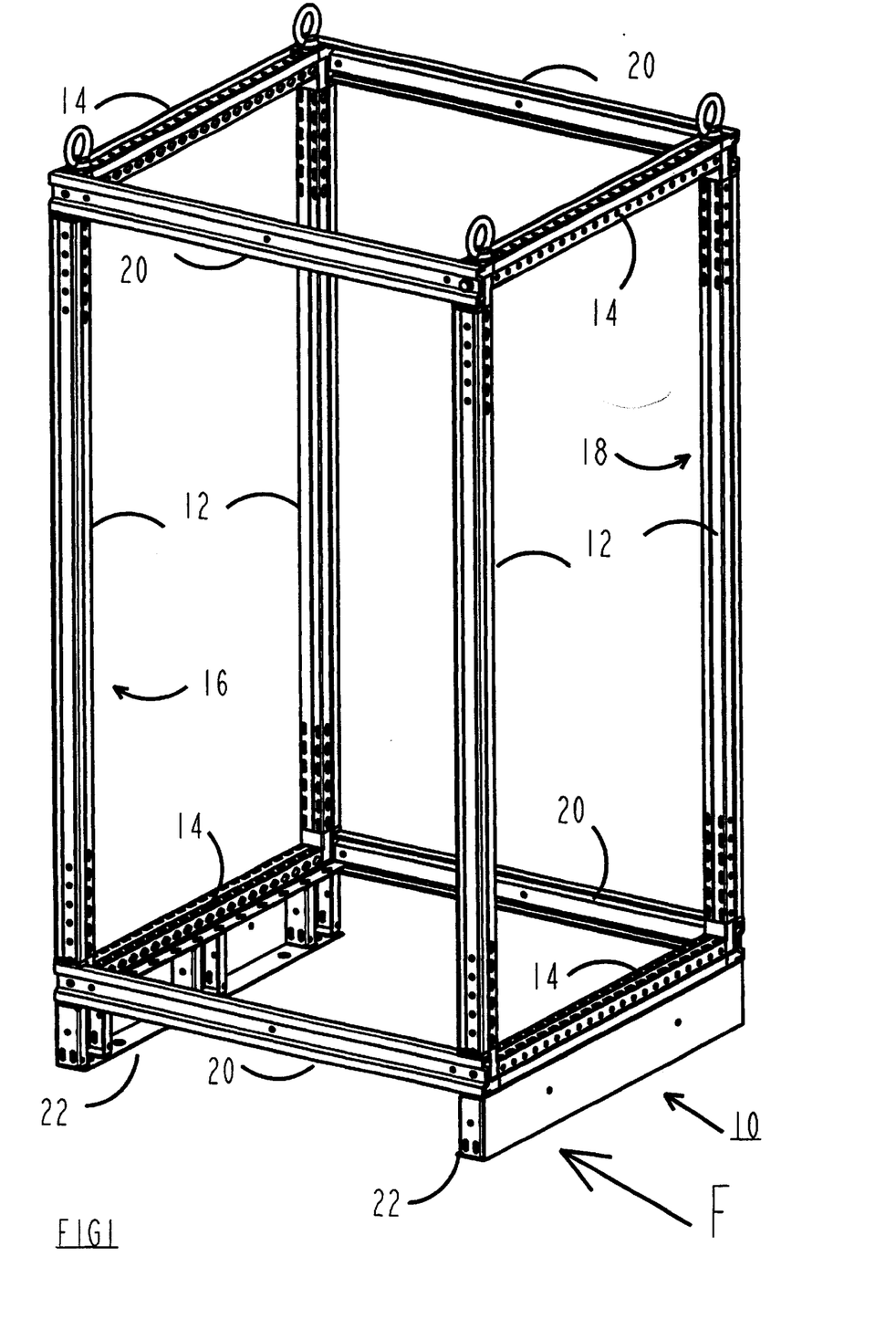
FIG. 1 is a perspective view of the frame according to the invention.
Figure 2:
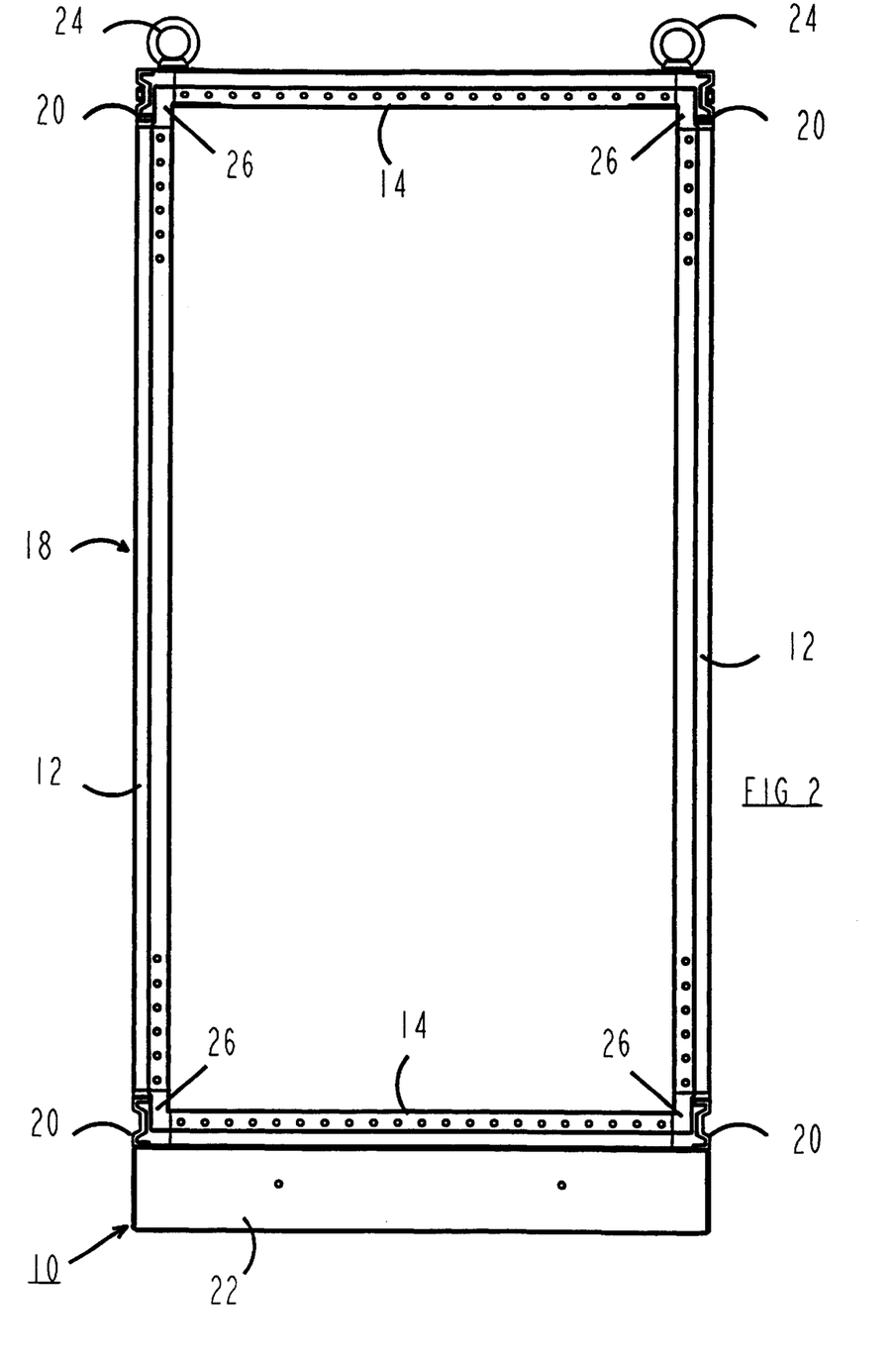
FIG. 2 shows a side view according to the arrow F of FIG. 1.
Figure 3:
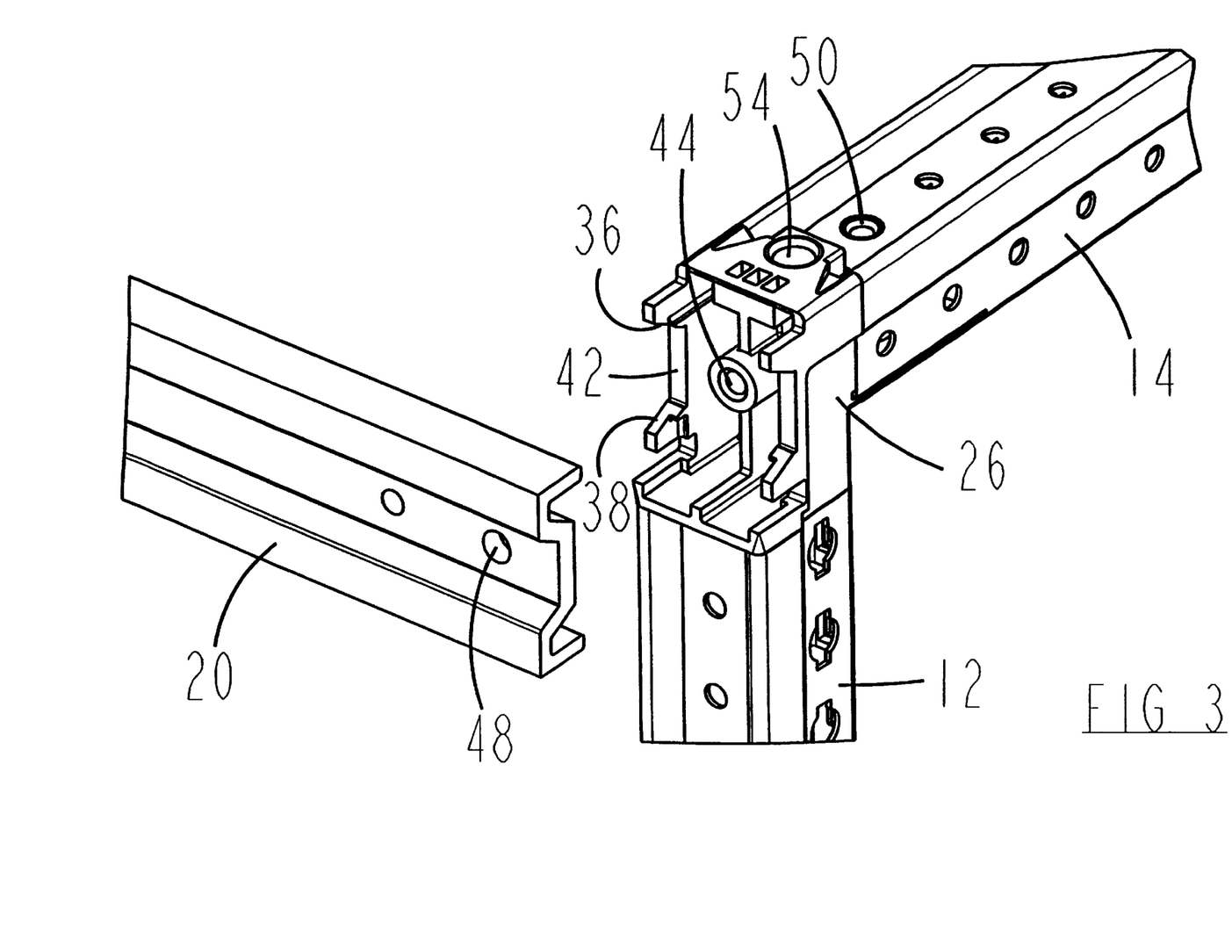
FIG. 3 represents an exploded perspective view of the system for assembly of a girder onto one of the sub-frames of the framework.
Figure 4:
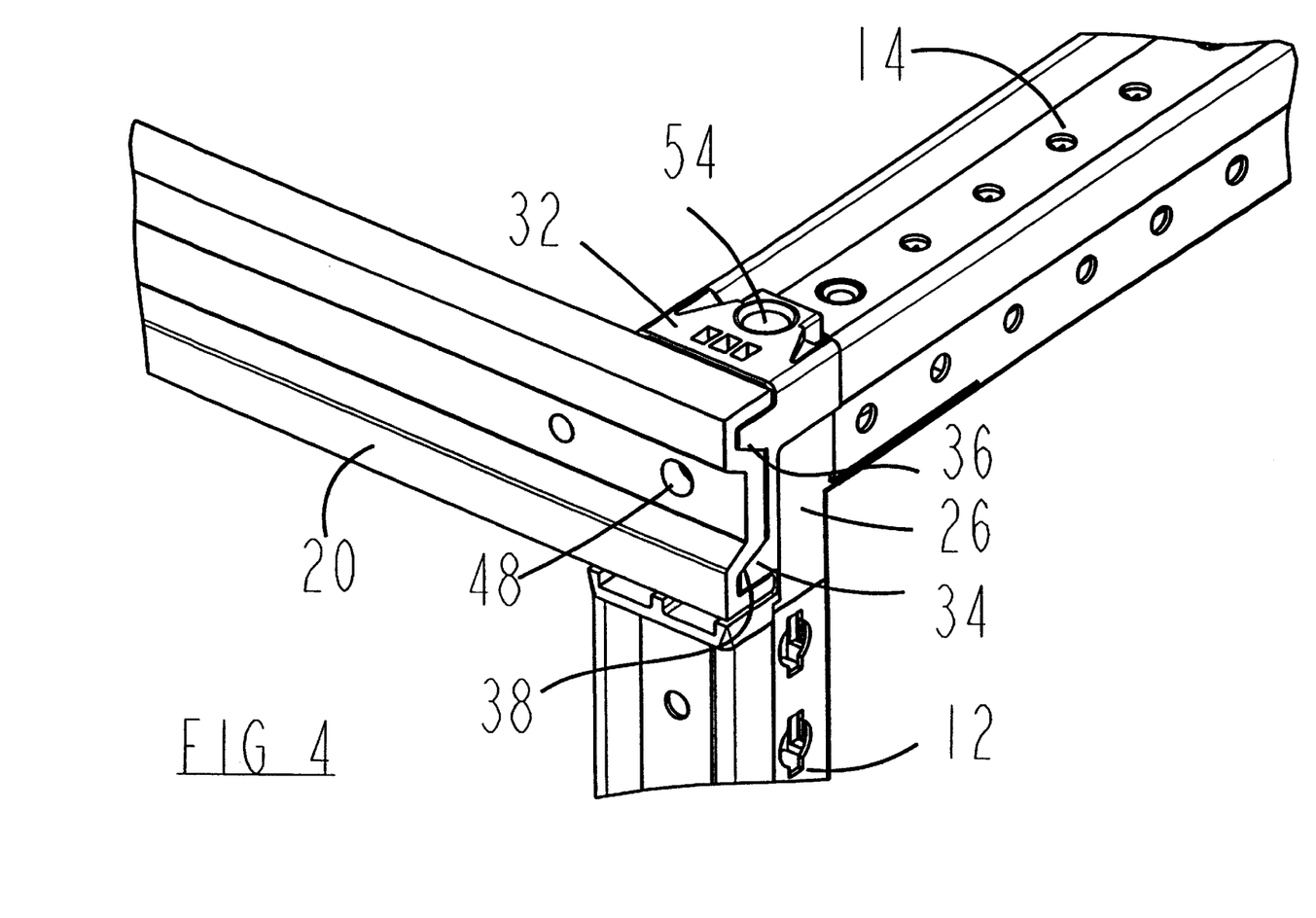
FIG. 4 is an identical view to FIG. 3 in the fitted position of the girder.

With reference to FIGS. 1 and 2, a metal frame 10 of an electrical cabinet presents a framework structure with a rectangular parallelepipedic profile comprising vertical uprights 12 in the form of pillars assembled to parallel cross-members 14 extending in the depthwise direction of the frame 10 to constitute two quadrangular sub-frames 16, 18 on the opposite sides. The two lateral sub-frames 16, 18 are interconnected by horizontal girders 20 parallel to the cross-members 14 and extending parallel to one another in the widthwise direction of the cabinet. The frame structure is supported at the bottom by a base 22 designed to rest on the ground and is provided with hoisting rings 24 at the four corners of the upper part, a single ring 24 being represented in FIG. 2. The uprights 12 and cross-members 14 are formed by straight hollow steel sections equipped with a series of holes spaced at regular intervals.

Figure 6:
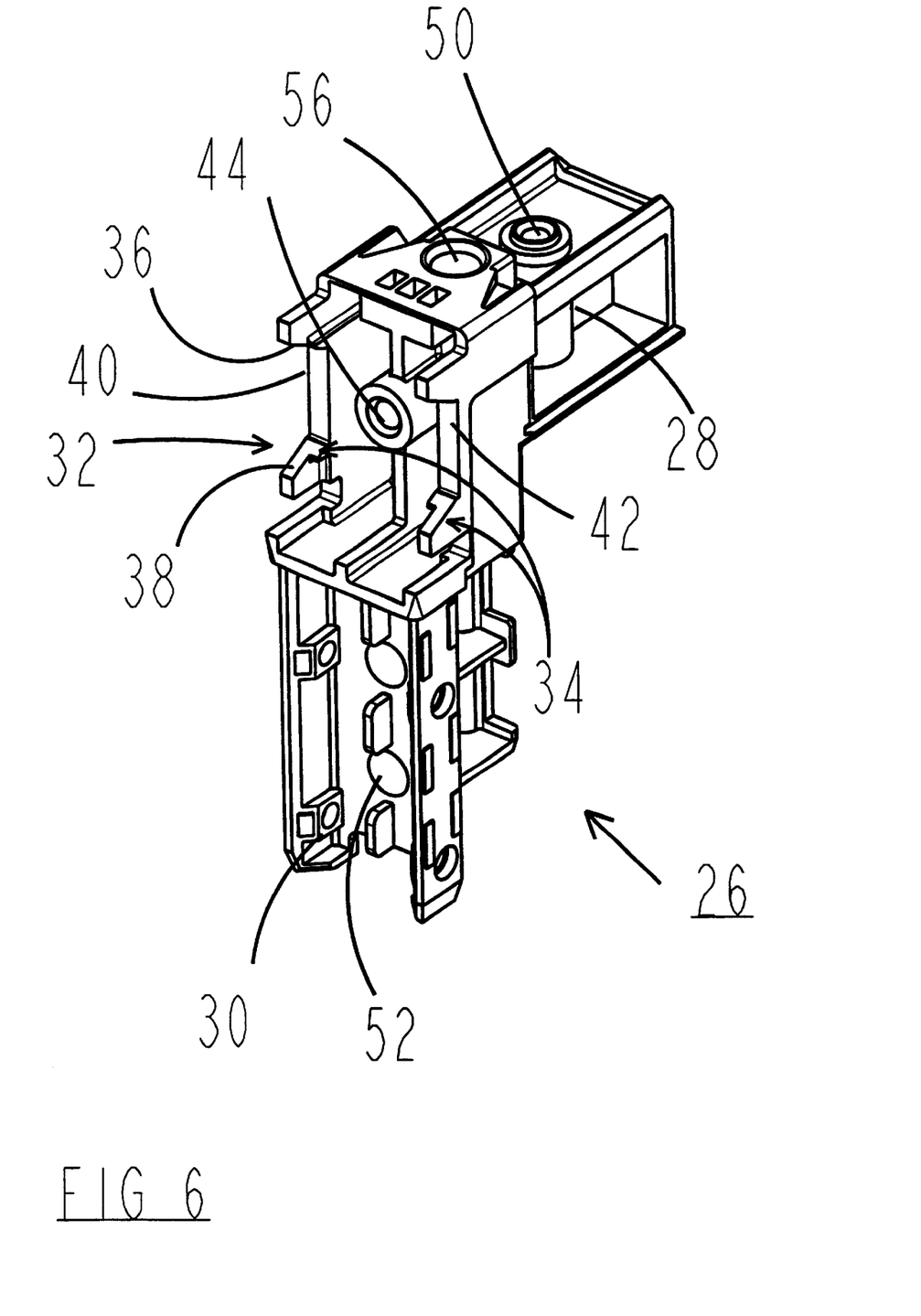
FIG. 6 is an enlarged scale perspective view of a joining part with a bipod according to the invention.

In FIGS. 3 to 7, each upright 12 is assembled to the corresponding cross-member 14 by a joining part 26, represented in detail in FIG. 6.

The structure of the frame 10 requires four identical joining parts 26 at the four corners of each sub-frame 16, 18. Each joining part 26 is arranged as a bipod comprising a first fitting element 28 designed to engage in an end of a cross-member 14, and a second fitting element 30 designed to be inserted in an end of an upright 12 so as to achieve an assembly in the form of a bracket. The two fitting elements 28, 30 are formed by studs extending perpendicularly to one another and protruding out from a common intermediate part 32.

The common part 32 of each joining part 26 is provided with positioning means 34 for the purposes of fixing an end of a girder 20. The positioning means 34 are formed by at least one pair of bearing faces 36, 38 arranged in a V-shape and confining a corner-piece 40 of trapezoid cross section open at the front and closed at the rear by a back face 42. The oblique bearing faces 36, 38 of the corner-piece 40 form an acute angle so as to obtain a predetermined clamping force of the girder 20. A tapped hole 44 is arranged in the center of the common part 32 and is designed to receive a fixing screw 46 of the girder 20. The fictitious peak of the acute angle of the corner-piece 40 is placed in the alignment with the direction of the hole 44 and of the fixing screw 46.

The girder 20 comprises a W-shaped section which fits into the corner-piece 40 coming into engagement with the oblique bearing faces 36, 38. Each end of the girder 20 is provided with an orifice 48 for a single screw 46 to pass through. Clamping of the girder 20 is performed on the bipod of the joining part 26 and is progressive as the screw 46 is tightened.

Figure 5:
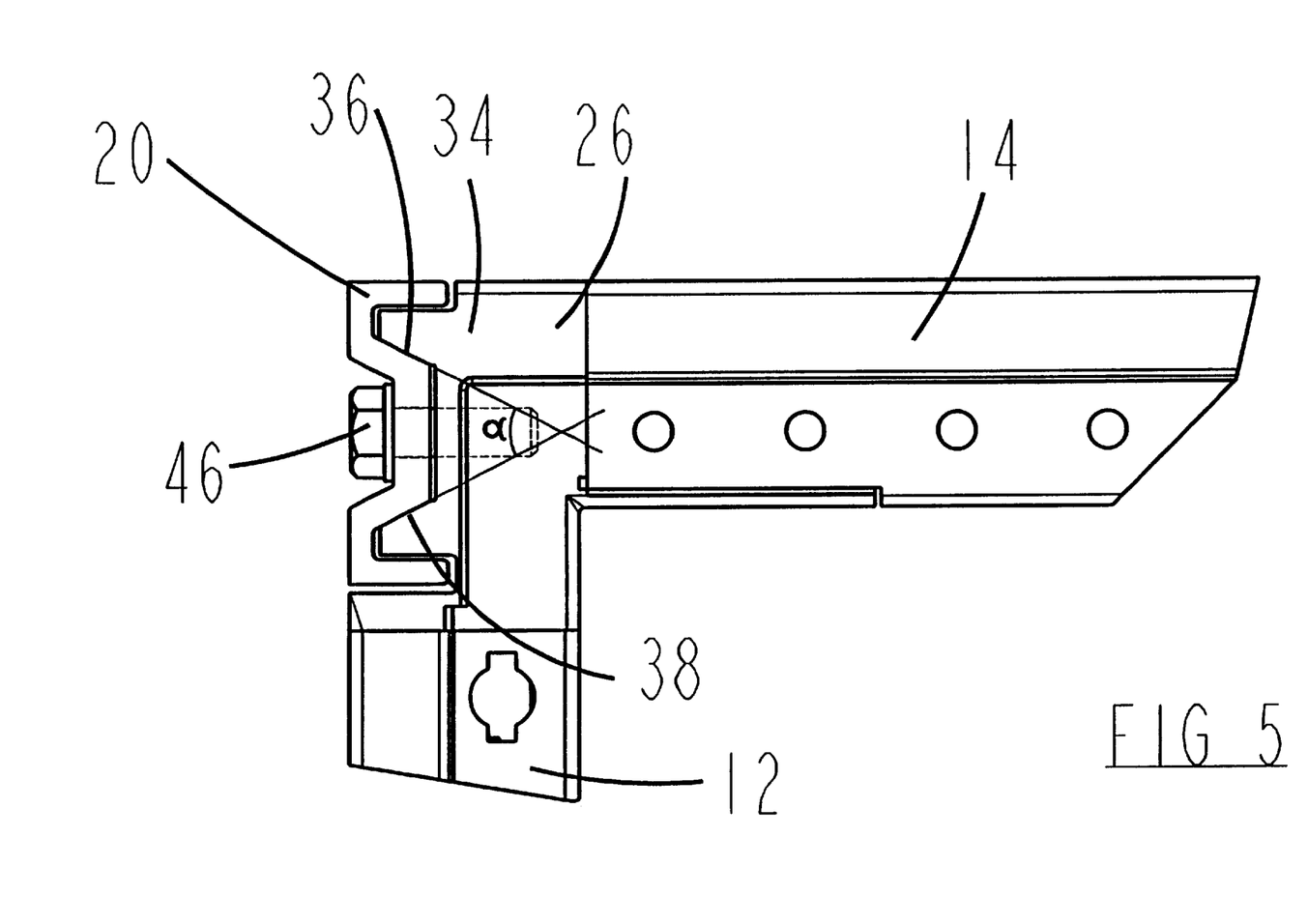
FIG. 5 shows a side view of FIG. 4.
Figure 5A:
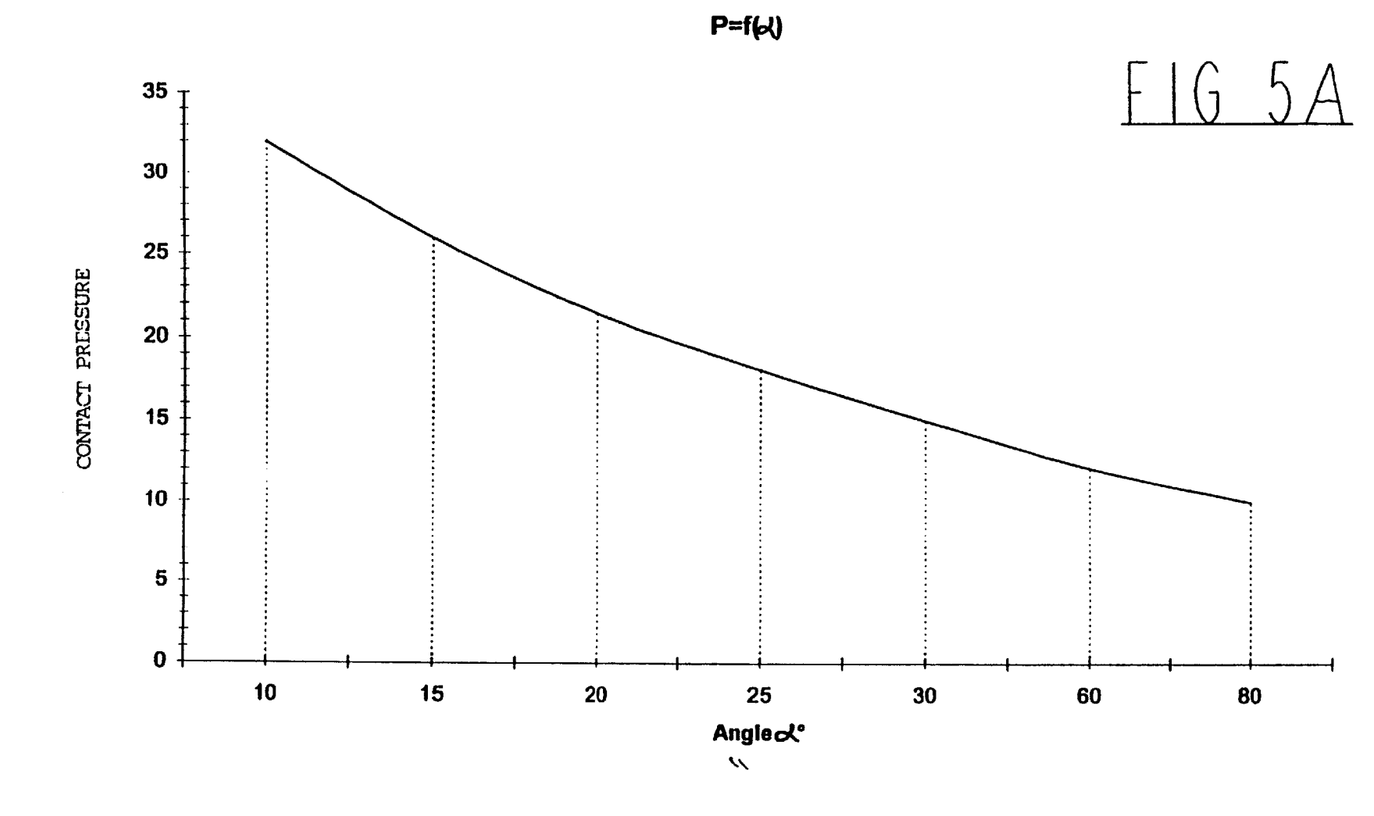
FIG. 5A illustrates the diagram of the contact pressure of the girder on the bipod according to the value of the acute angle of the corner-piece.

FIG. 5A shows the variation of the contact pressure of the girder 20 on the bearing faces 36, 38 according to the value of the acute angle of the corner-piece 40. An angle comprised between 20° and 40° will preferably be chosen enabling a good contact pressure at the end of tightening of the screw 46 to be conciliated with the possibility of subsequent disassembly of the girder 20. For angles of less than 20°, the jamming effect of the girder 20 in the corner-piece 40 would be liable to prevent this disassembly. For angles of more than 40°, the reduction of the contact pressure would moreover be detrimental to the mechanical strength of the frame 10.

Each fitting element 28, 30 of the joining parts 26 is equipped with a drilled hole 50, 52 in which a screw 54 is inserted for fixing the bipod to the cross-member 14 and to the upright 12. Another drilled hole 56 parallel to the hole 50 is provided in the common part 32 of each joining part 26 and serves the purpose of receiving either the hoisting ring 24 for the upper joining parts or the means for fixing the frame 10 to the support base 22 for the lower joining parts.

The girders 20 are made of aluminium by extrusion and the joining parts 26 are advantageously obtained by zinc and lead-based metal casting.

Assembly of the frame 10 is performed in the following manner:

The two lateral sub-frames 16, 18 are assembled first by means of eight joining parts 26 joining the four uprights 12 to the four corresponding cross-members 14. The screws 54 are screwed into the holes 50, 52 to make each sub-frame 16, 18 rigid. The pair of upper girders 20 and the pair of lower girders 20 then simply have to be fixed onto the joining parts 26 to constitute the frame 10. The progressive tightening effect of the girders 20 onto the convergent corner-pieces 40 of the bipods is determinant to obtain the required mechanical rigidity.

When the cables of the electrical equipment fitted in the cabinet are connected, it is easy to remove one of the girders 20 by unscrewing two screws 46 to facilitate access to the inside. Removing a girder 20 is quick and does not have a notable adverse influence on the rigidity of the frame 10.

Figure 7:
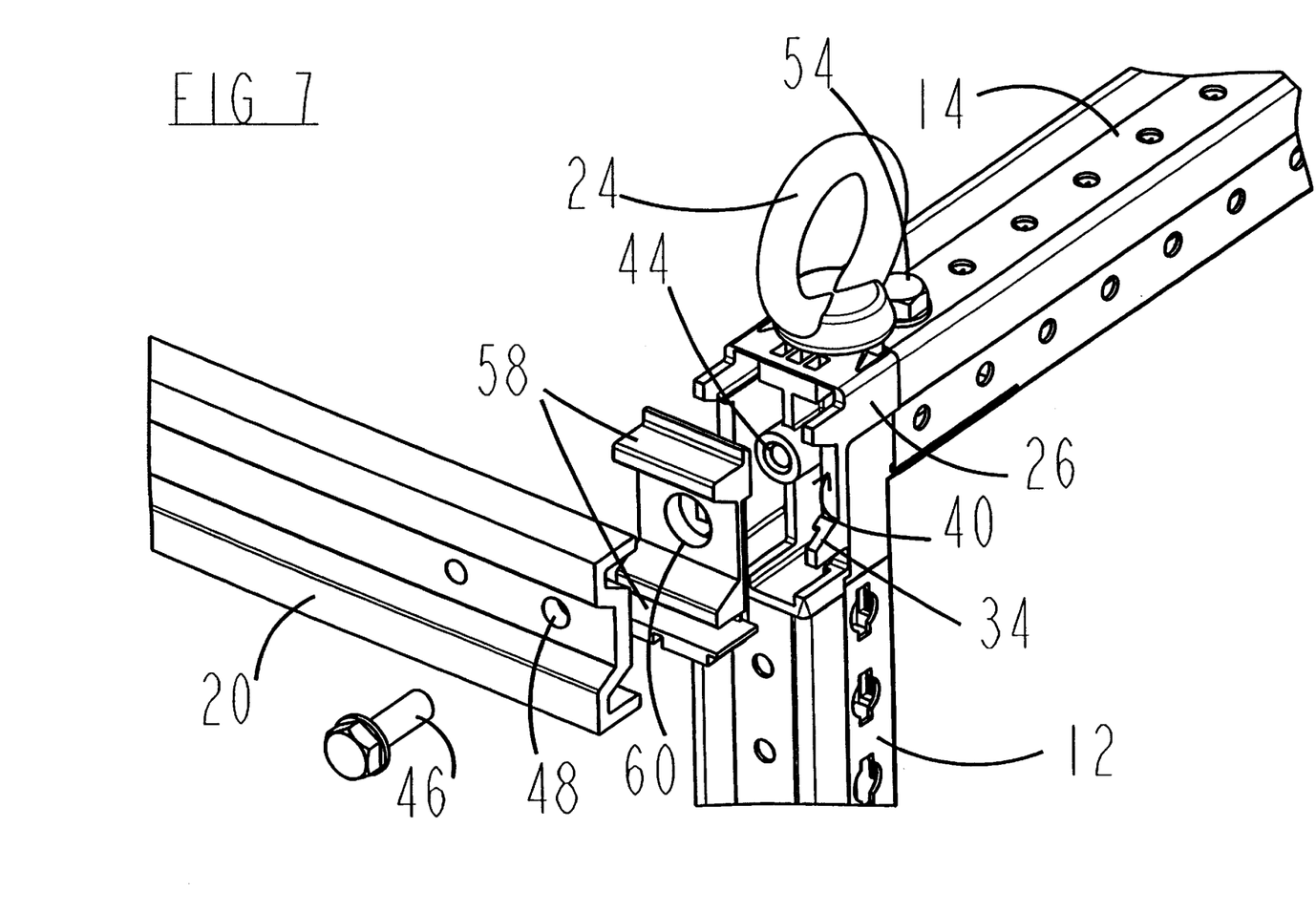
FIG. 7 represents an identical view to FIG. 3 of an alternative embodiment.

With reference to FIG. 7, a molded seal 58 can be fitted between the girder 20 and the common part 32 of each joining part 26 according to the tightness rating sought for. The seal 58 comprises a central hole 60 for the fixing screw 46 to pass through.

Figure 8:
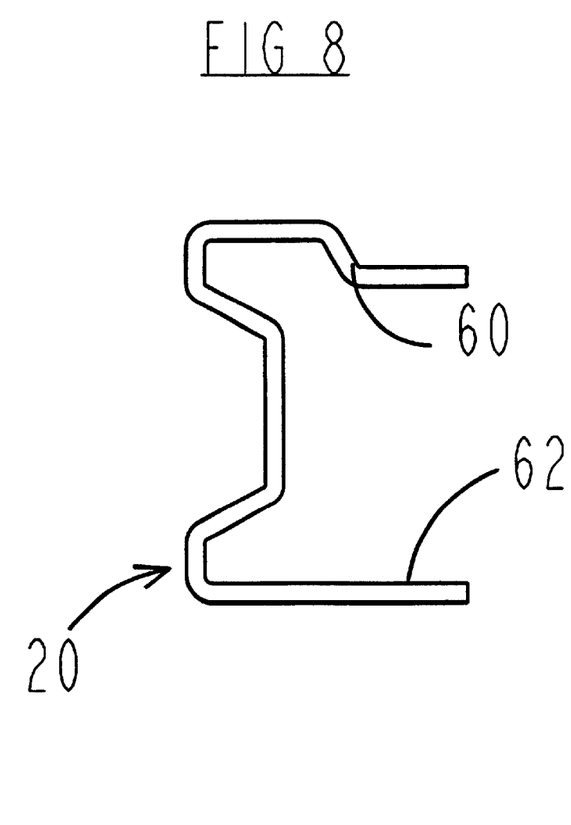
FIG. 8 and 9 show cross sectional views of the girder with two other steel profiled sections.
Figure 9:
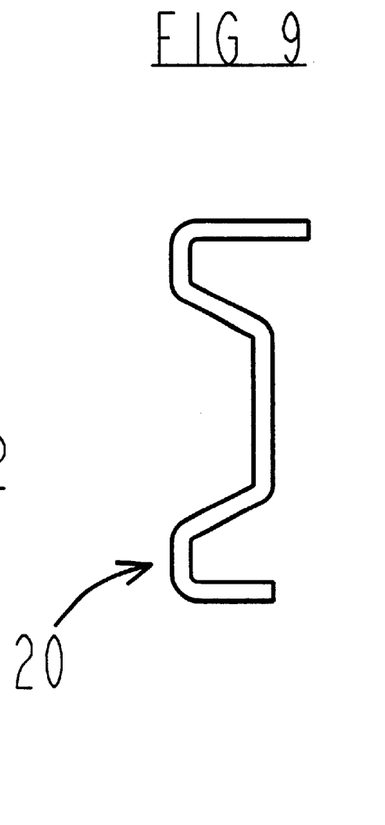

FIGS. 8 and 9 show two alternative embodiments of steel girders 20 obtained by cutting and folding operations. The thickness of the steel plate is in this case smaller than that of the aluminium girders according to FIGS. 1 to 7. The profiled section of FIG. 8 is used for fitting the roof of the cabinet and comprises extended wings 60, 62.

What is claimed is:

1. A metallic frame for an electrical cabinet, comprising:
   a) generally vertical uprights forming pillars;
   b) cross-members extending in a depthwise direction of the frame;
   c) generally horizontal girders extending in a widthwise direction of the frame;
   d) a joining part located at each corner of the frame for interconnecting a respective upright with a respective cross-member;
   e) said joining part being shaped as a bipod comprising a first fitting element positioned generally at a right angle to a second fitting element, and a common part intermediate to said first and second fitting elements;
   f) said joining part comprising positioning means for attaching one of said girders thereto;
   g) said positioning means comprising a pair of bearing faces arranged in a generally V-shaped configuration and defining a convergent corner-piece having an acute angle for fitting therein an end of said one of said girders of a conjugate shape;
   h) a fixing screw for progressive tightening of said one of said girders onto said corner-piece; and
   i) said one of said girders comprising a generally W-shaped section and including a hole at each end thereof for receiving one said fixing screw.

2. The frame according to claim 1, wherein the corner-piece comprises a generally trapezoid cross section open at the front and closed at the rear by a back face.

3. The frame according to claim 1, wherein a tapped hole is provided substantially in the center of the common part to receive the fixing screw.

4. The frame according to claim 3, wherein:
   a) said bearing surfaces are inclined toward one another in a first direction;
   b) the tapped hole extends in a second direction; and
   c) said first and second directions are in general alignment with each other.

5. The frame according to claim 1, wherein the acute angle of the corner-piece comprises an angle of about 20° to 40°.

6. The frame according to claim 1, wherein the girders are made of a material selected from the group consisting of aluminum and steel.

7. The frame according to claim 1, wherein each joining part comprises a tapped hole for receiving a hoisting ring or for fixing the frame to a support base.

8. The frame according to claim 1, wherein a seal is provided between one said girder and the common part of a respective joining part.

* * * * *